April 23, 1968  P. E. NAPOLITANO  3,379,407
BLEEDER VALVE
Original Filed Jan. 4, 1961
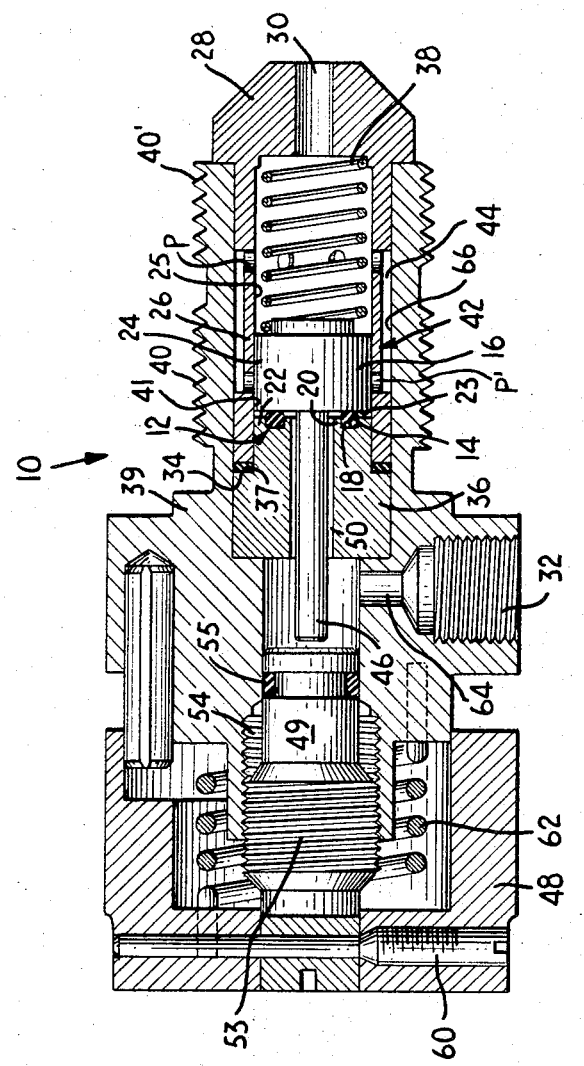
INVENTOR.
PELLEGRINO E. NAPOLITANO
BY
Brumbaugh, Free, Graves & Donohue
his   ATTORNEYS 3,379,407
BLEEDER VALVE
Pellegrino E. Napolitano, 1415 57th St.,
Brooklyn, N.Y. 11219
Original application Jan. 4, 1961, Ser. No. 80,692. Divided and this application Nov. 27, 1964, Ser. No. 414,131
1 Claim. (Cl. 251—210)

This is a division of co-pending application Ser. No. 80,692, filed Jan. 4, 1961, for "Bleeder Valve," now Patent No. 3,171,440, and also discloses certain subject matter common to application Ser. No. 805,498, filed Apr. 10, 1959, now abandoned, co-pending with application Ser. No. 80,692.

The present invention relates to bleeder valves and, in particular, to a new and improved bleeder valve adapted to operate efficiently and economically at high differential pressures.

In general, conventional bleeder valves sacrifice either effectiveness or durability. Although valves having mating elements made of metal or the like may be durable, they tend to leak at high differential pressures, despite careful machining of the mating surfaces. On the other hand, valves employing an O-ring seal of rubber or similar resilient materials, while effective in preventing high-pressure leakage, are susceptible to rapid erosion of the sealing elements by the high-velocity fluid flow which may occur even when the valve is fully open and which is especially likely to occur during opening and closing of the valve. In some cases, an O-ring is so distorted by rapidly moving fluid as the valve closes that it is mutilated by the associated metal parts of the valve. Moreover, conventional valves intended to provide a combination of different types of closures in series generally have a plurality of moving valve members and are relatively complex and costly to manufacture and repair.

An object of the present invention is to provide a new and improved bleeder valve which is long-lasting yet adapted to provide a seal of maximum effectiveness.

Another object of the invention is to provide a bleeder valve which has a minimum of parts and which is inexpensive to manufacture and repair.

These and other objects of the invention are accomplished by providing a bleeder valve having only one movable valve member but forming two separate and distinct closures in series, a first closure being a highly-effective fluid seal and the second closure being highly-resistant to erosion and protecting the first.

The first closure is formed by the valve member and the wall of the bore in which the valve member is mounted. The valve member and wall are preferably made of metal or another erosion-resistant material. The second closure is formed by the same valve member and resilient sealing means such as an O-ring adapted to form a fluid-tight seal with the valve member. The second closure opens before and closes after the first. A reduced cross-sectional flow area on the low-pressure side of the second closure and remote therefrom limits the maximum velocity of flow past the O-ring when the valve is fully open and when it is being opened or closed.

An understanding of further aspects of the invention may be gained from a consideration of the following description in conjunction with the single figure in the drawing, which illustrates in longitudinal section a representative valve constructed in accordance with the invention.

As the figure shows, the representative valve 10 constructed in accordance with the invention is provided with a resilient seal 12 (the "second" closure referred to above) formed by resilient annular sealing means such as an O-ring 14 and a poppet valve member 16. The O-ring 14 is retained in an annular groove 18 formed by an annular shoulder 20 tangent to the O-ring 14 on the inner side thereof and an outer annular shoulder 22 tangent to the O-ring 14 on the outer side thereof. The shoulders 20 and 22 and the O-ring 14 are concentric, and the O-ring 14 extends forwardly of the shoulders 20 and 22—i.e., towards the high-pressure end of the valve 10 (the right-hand side of the valve 10 as seen in the figure)—for engagement with the poppet member 16.

The poppet member 16 is constructed so that its rearward surface 17—i.e., the surface facing the low-pressure end of the valve 10—lies in a plane and establishes a seal with the O-ring 14 when the poppet valve member 16 is in its rearmost or completely-closed posiiton (the position shown in the figure). In this position, the poppet valve member 16 forces the O-ring 14 tightly against the cylindrical side walls and the rear wall of the groove 18 in which the O-ring 14 is retained.

If there is a tendency towards seepage between the circumferential cylindrical wall 24 of the poppet valve member 16 and the valve bore 25 defined by the interior cylindrical wall of a sleeve 26 or rearward extension of a nose cap 28, the pressure of the fluid forces the O-ring 14 more tightly against the inner shoulder 20. If there is a back pressure, the O-ring 14 is forced more tightly against the outer shoulder 22. Thus, in either case, the O-ring 14 tends to be deflected in such a way as to eliminate seepage between the high-pressure area at the valve inlet 30 and the low-pressure area at the valve outlet 32.

The sleeve 26 or rearward nose cap extension extends rearwardly into engagement with a shoulder 34 formed on the outer periphery of a sleeve 36. Resilient sealing means such as an O-ring 37 forms a seal between the sleeves 26 and 36 and a housing member 39. The housing member 39 is provided with securing means such as threads 40, 40' to facilitate securing the valve 10 in a bulkhead or to another line, for example. The housing 39 and sleeves therein constitute a valve body portion.

Biasing means such as an expansion coil spring 38 bearing at its forward end against the nose cap 28 urges the poppet valve member 16 rearwardly against the O-ring 14. The poppet valve member 16 is machined to fit snuggly within the bore 25. In particular, the bore 25 is at least in part parallel-walled (cylindrical, for example), and the peripheral wall 24 of the poppet valve member 16 is complemental in shape to that part of the bore 25. The bore 25 forms a valve seat 41, and the valve member 16 and valve seat 41 form an erosion-resistant closure 42 (the "first" closure referred to above) in longitudinally-spaced-apart series relation with the resilient closure 12.

Ports $p$ and $p'$ in the wall of the bore 25 are provided through which fluid can pass around the poppet valve member 16 only when the valve member 16 is moved forwardly sufficiently to be spaced from its valve seat 41. It is to be noted that the longitudinal spacing between the ports $p$ on the one hand and the ports $p'$ on the other is greater than the longitudinal length of the poppet valve member 16. The port or ports $p'$ nearest the O-ring 14 are not uncovered by the wall 24 of the poppet valve member 16 until the poppet valve member 16 is well away from the O-ring 14. When the port or ports $p'$ nearest the O-ring 14 are uncovered by the poppet valve member 16, fluid flows through the ports $p$, a chamber 44 connecting the ports $p$ and $p'$, and the ports $p'$. When the valve 10 is in its open state, therefore, fluid flows around the poppet valve member 16.

Thus, the O-ring 14 is protected from erosion, inasmuch as, during the period when the poppet valve member 16 is unseating from the O-ring 14, the first closure 42 between the poppet valve member 16 and the valve seat 41 remains closed. Only when the poppet valve member 16 is well away from the O-ring 14 is the passage around the poppet valve member 16 through the ports *p* and *p'* and the chamber 44 opened. On closing, the passage around the poppet valve member 16 is closed off before the poppet valve member 16 seats on the O-ring 14.

Moreover, when the valve 10 is fully open, a stem 46 integral with the poppet valve member 16, which stem is actuated manually by a knob 48 or in any other suitable manner by means for overriding the spring 38, maintains the maximum flow velocity in the vicinity of the O-ring 14 at a safely low value. The maximum flow velocity area is in the vicinity of the stem 46 because the cross-sectional flow area for the fluid is minimized at that point by making the cross section of the stem 46 nearly as great as the cross section of the passage 50 in the sleeve 36 through which the stem 46 passes. This area of maximum flow velocity is safely removed from the locus of the O-ring 14. Thus, the O-ring 14 is protected from erosion both on opening and closing of the valve and when the valve is in its fully opened state.

As described in application Ser. No. 805,498 referred to above, an external thread 53 on a push rod 49 engages a complementary thread 54 so that rotary motion of the push rod in the proper direction advances it against the rear end of the stem 46 to open the valve. To rotate the push rod 49, which carries an O-ring 55 forming a seal with the bore 25, the knob 48 is joined to the rod by a transverse pin 60, the knob and push rod being urged toward the closed position by a spring 62. The spring 38 and associated means for urging the valve to a closed position and the knob 98 and associated means permitting overriding the spring 38 to open the valve together constitute control means for controlling the state of the valve. At the outlet opening 32, a restricted throat 64 may be provided further to impede the fluid flow, thereby reducing the velocity through the valve 10.

Throughout the specification, the interior wall of the sleeve 26 has been considered to define a part of the valve bore. From another standpoint, the interior wall 66 of the housing member 39 may be considered the bore, in which case the sleeve 26 is guide means fitting closely about the valve member 16 for guiding the valve member 16 in the open state, and the ports *p* and *p'* and chamber 44 are bypass means for directing fluid to flow around the valve member 16 in the open state.

Thus, there is provided in accordance with the invention a novel and highly-effective bleeder valve adapted to operate efficiently at high differential pressures and having a minimum of parts. Many modifications of the representative embodiment of the invention disclosed herein will readily occur to those skilled in the art. For example, the poppet valve member 16, which has been illustrated as cylindrical, may also be prismatic or have, in fact, any shape in cross section. Also, if the poppet valve member 16 were provided with peripheral longitudinal flutes, the ports *p* on the one hand and *p'* on the other could be spaced apart from each other a longitudinal distance less than the longitudinal length of the poppet valve member 16 and the device could remain operative in accordance with the invention. Accordingly, the invention is to be construed as including all structure falling within the scope of the appended claim.

I claim:

1. A bleeder valve comprising a body portion having a partly parallel-walled bore with an inlet and an outlet, a valve member mounted in said bore having a parallel-walled part complemental in shape to the parallel-walled part of said bore and fitting snugly within said part of said bore, said part of said bore including means defining a first valve seat, a second valve seat in said bore disposed with respect to said first valve seat longitudinally of said bore, said parallel-walled part of said bore having at least two ports therein spaced apart from each other longitudinally of said bore, said body portion forming a chamber extending between and communicating with said ports on the exterior of said bore, said valve member and said first valve seat being made of metal and making metal-to-metal contact when in the closed position to prevent passage of fluid through said ports and chamber and around said valve member, and said second valve seat including resilient sealing means, biasing means for continuously urging said valve member into sealing relation with said first and second valve seats, and biasing-means-overriding means for selectively separating said valve member from said first and second valve seats, said biasing-means-overriding means effecting separation of said valve member and said resilient sealing means prior to the separation of said valve member and said first valve seat and said biasing means effecting closing of said valve means and said first valve seat prior to closing of said valve means and said resilient sealing means, fluid being permitted to pass when said valve member is separated from both said resilient sealing means and said first valve seat through said ports and chamber and around said valve member, and means connected to said valve member within said bore and extending remotely therefrom for reducing the cross-sectional flow area of said fluid at a location remote from said resilient sealing means to minimize the maximum velocity of fluid flow adjacent to the locus of said resilient closure and prevent erosion of said resilient closure.

References Cited

UNITED STATES PATENTS

| | | | |
|---|---|---|---|
| 806,309 | 12/1905 | White | 251—210 |
| 934,286 | 9/1909 | Cole | 137—516.27 X |
| 970,225 | 9/1910 | Holden | 251—325 X |
| 2,311,851 | 2/1943 | McClure | 137—516.27 X |
| 2,638,108 | 5/1953 | Williams et al. | 137—625.26 X |
| 2,819,799 | 1/1958 | Wilkerson | 251—210 X |
| 2,930,578 | 3/1960 | Piros | 251—138 X |
| 2,931,385 | 4/1960 | Carlisle et al. | 251—210 X |
| 3,233,863 | 2/1966 | Bowen et al. | 251—210 |

M. CARY NELSON, *Primary Examiner.*

R. C. MILLER, *Assistant Examiner.*